United States Patent
Iwai et al.

(10) Patent No.: US 7,436,606 B2
(45) Date of Patent: Oct. 14, 2008

(54) OPTICAL COMPONENT MODULE AND CAMERA MODULE

(75) Inventors: Yoshifumi Iwai, Nara (JP); Hideaki Fujita, Nara (JP); Masayuki Nishikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/581,958

(22) Filed: Oct. 16, 2006

(65) Prior Publication Data

US 2007/0091477 A1    Apr. 26, 2007

(30) Foreign Application Priority Data

Oct. 14, 2005    (JP) .............................. 2005-300617

(51) Int. Cl.
G02B 7/02    (2006.01)
(52) U.S. Cl. .................. 359/811; 359/813; 359/814
(58) Field of Classification Search ................. 359/811, 359/812, 813, 819, 821, 822, 824, 825, 826, 359/829, 830, 814, 823
See application file for complete search history.

(56) References Cited

U.S. PATENT DOCUMENTS

| 3,036,506 | A | * | 5/1962 | Andresen, Jr. ............... 396/27 |
| 4,873,542 | A | * | 10/1989 | Nakayama ................... 396/144 |
| 4,878,214 | A | | 10/1989 | Hinotani |
| 5,177,638 | A | * | 1/1993 | Emura et al. ................. 359/704 |
| 7,221,525 | B2 | * | 5/2007 | Honda et al. |
| 2003/0107667 | A1 | * | 6/2003 | Abe et al. .................... 348/341 |
| 2003/0197899 | A1 | | 10/2003 | Tseng et al. |
| 2005/0140818 | A1 | | 6/2005 | Uemura et al. |
| 2006/0013577 | A1 | | 1/2006 | Uemura et al. |

FOREIGN PATENT DOCUMENTS

| EA | 0 751 413 | 1/1997 |
| JP | 01-231009 | 9/1989 |
| JP | 2002-014270 | 1/2002 |
| JP | 2005-195669 | 6/2005 |
| JP | 2005-195669 | 7/2005 |
| JP | 2005-215538 | 8/2005 |

* cited by examiner

Primary Examiner—Timothy J Thompson
(74) Attorney, Agent, or Firm—Edwards Angell Palmer & Dodge LLP; David G. Conlin; Peter J. Manus

(57) ABSTRACT

There are provided an optical component module and a camera module capable of preventing damage to the camera module, particularly the optical component module against an impact applied from the outside due to falling, etc. of an apparatus on which the camera module is mounted, even if the strength of the case deteriorates due to miniaturizing, slimming, and weight reducing of the camera module. In the optical component module, a lens that is at least one optical component that is movable in a direction of an optical axis is provided within a case having openings and a primary axis shaft that guides movement of the lens in the direction of the optical axis is provided in the openings. By providing the primary axis shaft, deformation of the case can be suppressed. If an optical pickup device is mounted on the optical component module, a camera module can be formed.

6 Claims, 3 Drawing Sheets

OPTICAL COMPONENT MODULE AND CAMERA MODULE

CROSS-REFERENCE TO RELATED APPLICATION

This application claims priority to Japanese Patent Application No. JP 2005-300617, which was filed on Oct. 14, 2005, the contents of which, are incorporated herein by reference, in their entirety.

BACKGROUND OF THE INVENTION

1. Field of the Invention

The present invention relates to an optical component module capable of moving an optical component to be received in a direction of an optical axis, and a camera module including such an optical component module and an image pickup device.

2. Description of the Related Art

In the related art, a camera module into which an optical component and an image pickup device is assembled in advance is mounted on a compact camera, a digital camera, and the like. The camera module is being highly functionalized such that it is provided with an automatic focusing and zooming mechanism so as to be capable of performing zooming photographing of wide angle and telescoping as well as it can cope with a high number of pixels including millions of pixels.

Generally, a camera module includes an optical system having a plurality of lenses, and a board on which an image pickup device is mounted. In a highly advanced camera module, wide-angle and telescoping photographing is allowed by changing the relative position of lens holders that holds a plurality of lenses.

On the other hand, in order to cope with miniaturizing and slimming of an apparatus, demands for making a camera module compact, slim, and lightweight is being increased. In order to meet this demand, a lens system to be used for an optical system of the camera is made small or a case of the camera is thinned. As a result, problems occur in that processing precision is deficient, or an impact is applied to the camera module when the apparatus has fallen and thereby the camera module is damaged.

For example, there is a lens as a typical optical component. As a lens unit including the lens as an optical component, there is a box-shaped lens unit (for example, see Japanese Unexamined Patent Publication JP-A 2002-14270 (FIG. 1)) in which one opening is provided at the top of the unit, and an optical component, such as a lens is assembled through the opening. In this lens unit, a main body having the opening is formed by plastic molding.

Since the optical component is assembled into the main body, the optical performance of the whole lens unit deteriorates due to deficiency in the processing precision of the main body, whereas the optical efficiency is improved by the high-precision main body. More specifically, a recess that extends in the direction of the optical axis is formed in an intersecting part between walls in the box-shaped lens unit. Since this recess is provided to decrease deformation of the main body, it is estimated that deformation resulting from a difference in cooling speed inside and outside the main body is reduced.

Further, a camera module miniaturized by providing a structure in which a housing that holds lens and becomes a whole base is provided at one end of an optical axis of an optical system, and two adjacent side surfaces and a shaft are erected parallel to the optical axis from housing is also disclosed (for example, see Japanese Unexamined Patent Publication JP-A 2005-195669 (FIG. 4)). That is, in the camera module disclosed in JP-A 2005-195669, in order to miniaturize the module, only a surface on which a front lens is to be mounted and two side surfaces parallel to an optical axis passing through this surface and the center of the lens are formed in the housing. Two shafts are provided adjacent to the side surfaces, and the shafts guide sliding of a lens holder that holds a movable lens.

In the configuration disclosed in JP-A 2002-14270, there is a problem in that optimization for the structure including the width, depth, and shape of the recess is required. Further, there is also a problem in that, when the case is intended to be thinned, the strength of a portion of the recess deteriorates. In addition, a guide shaft that guides so as to move a movable lens group parallel to the optical axis is provided in the vicinity of the recess.

In the configuration disclosed JP-A 2005-195669, although there is no deterioration of the optical performance resulting from deformation of the case, only one side of the shaft is fixed. For this reason, there are problems in that the optical performance may deteriorate, such that, during the sliding of the lens holder, the shaft vibrates or the lens holder is slipped off from the other side of the shaft that is not fixed,

SUMMARY OF THE INVENTION

An object of the invention is to provide an optical component module and a camera module capable of preventing damage to the camera module, particularly the optical component module against an impact applied from the outside due to falling of an apparatus on which the camera module is mounted, even if the strength of the case deteriorates due to miniaturizing, slimming, and weight reducing of the camera module.

The invention provides an optical component module comprising:

a case that receives at least one optical component that is movable in a direction of an optical axis, and has an opening along the optical axis; and a shaft that is provided in the opening to guide movement of the optical component in the direction of the optical axis.

According to the invention, since the optical component module includes the case and the shaft, and the case receives at least one optical component that is movable in a direction of an optical axis, and has an opening along the optical axis, assembling work of receiving the optical component into the case can be performed through the opening. Since the shaft is provided in the opening to guide movement of the optical component in the direction of the optical axis, the rigidity of the opening is enhanced, so that deterioration of the strength of the case caused by the opening can be compensated. Even if the strength of the case deteriorates due to miniaturizing, slimming, and weight reducing of the camera module, etc. including the optical component module, it is possible to prevent damage to the optical component module against an impact applied from the outside due to falling of an apparatus on which the camera module is mounted.

Further, in the invention, it is preferable that the case is formed into a columnar shape that extends substantially in the direction of the optical axis, and the opening is provided in a side surface of the case of the columnar shape.

According to the invention, since the case is formed into a columnar shape that extends substantially in the direction of the optical axis, and the opening is provided in a side surface of the case of the columnar shape, it is possible to assemble the optical component, which is movable in the direction of the optical axis within the case, through the opening.

Further, in the invention, it is preferable that the case is formed into a substantially prismatic shape, and the openings are provided in at least two adjacent side surfaces of the case.

According to the invention, since the case has a substantially prismatic shape, and at least two adjacent side surfaces are opened, the opening provided in one side surface will not have any one of the adjacent side surfaces of the case. As a result, when an optical component is assembled into the case through the opening, assembling adjustment becomes easy without receiving interference from the side surfaces on both sides of the opening.

Further, in the invention, it is preferable that the shaft is provided in a boundary between the two adjacent side surfaces of the case.

According to the invention, deterioration of strength that is caused by proving openings in two adjacent side surfaces of the case can be compensated by providing a shaft at the boundary.

Further, in the invention, it is preferable that a plurality of the shafts are provided.

According to the invention, an optical component that is moved within the case by a plurality of shafts can be guided in the direction of the optical axis with high precision, and the case can be reinforced.

Further, in the invention, it is preferable that the case is composed of a single member.

According to the invention, since the case is formed of a single member, receiving or holding of an optical component is performed without requiring assembling work, and thus miniaturization or weight reducing can be achieved.

Further, in the invention, it is preferable that the case is made of a flexible material.

According to the invention, since the case is made of a flexible material, even if the case is deformed if necessary when an optical component, etc. is assembled into the case, damage can be hardly caused. Since the optical component module is reinforced by the shaft, processing precision can be maintained.

Moreover, the invention provides a camera module comprising:

any one of the above-mentioned optical component modules; and an image pickup device.

According to the invention, since the camera module includes any one of the optical component modules as mentioned above, even if the strength of the case deteriorates due to miniaturizing, slimming, and weight reducing, it is possible to prevent damage to the camera module against an impact applied from the outside due to falling of an apparatus on which the camera module is mounted.

According to the invention, the case that receives at least one optical component that is movable in a direction of an optical axis and that has an opening along the optical axis is increased in strength and reinforced by the shaft provided in the opening. It is also possible to prevent damage to the optical component module against an impact applied from the outside due to falling of an apparatus on which the camera module, etc. including the optical component module is mounted.

According to the invention, since the case is formed into a columnar shape that extends in the direction of the optical axis of the optical component, and the opening is provided in a side surface of the case of the columnar shape, it is possible to assemble the optical component, which is movable in the direction of the optical axis within the case, through the opening.

According to the invention, even if the case is miniaturized, when an optical component is assembled into the case through the opening, assembling adjustment becomes easy without receiving interference from the side surfaces on both sides of the opening.

According to the invention, deterioration of strength that is caused by proving openings in two adjacent side surfaces can be compensated by providing a shaft at the boundary.

According to the invention, it is possible to guide an optical component with high precision by a plurality of shafts and it is also possible to reinforce the case.

According to the invention, receiving or holding of an optical component is performed without requiring assembling work, and thus miniaturization or weight reducing can be achieved.

According to the invention, the case can be deformed if necessary when an optical component, etc. is assembled into the case, damage can be hardly caused. Since the optical component module is reinforced by the shaft, processing precision can be maintained.

According to the invention since an optical component module in which a shaft to be used for moving an optical component in the direction of the optical axis is provided in a region that is overlapped with the opening of the case is included, it is possible to obtain a camera module capable of preventing deformation of the case and having high rigidity.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1A:
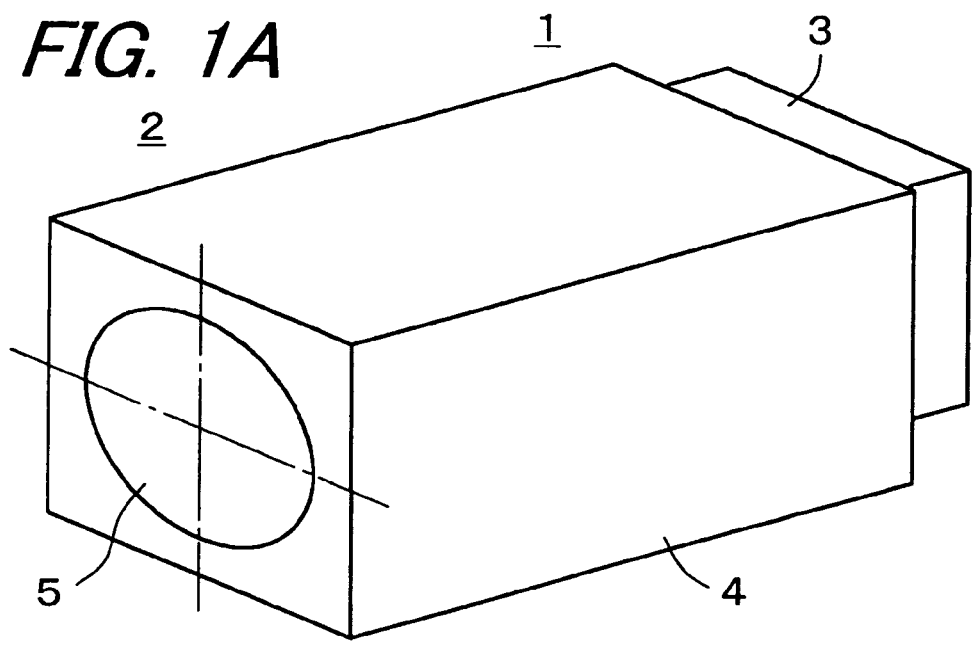
FIGS. 1A and 1B are respectively a perspective view showing an external configuration of a camera module according to an embodiment of the invention, and a sectional view showing a schematic configuration of an optical system.

Now referring to the drawings, preferred embodiments of the invention are described below.

Figure 1B:
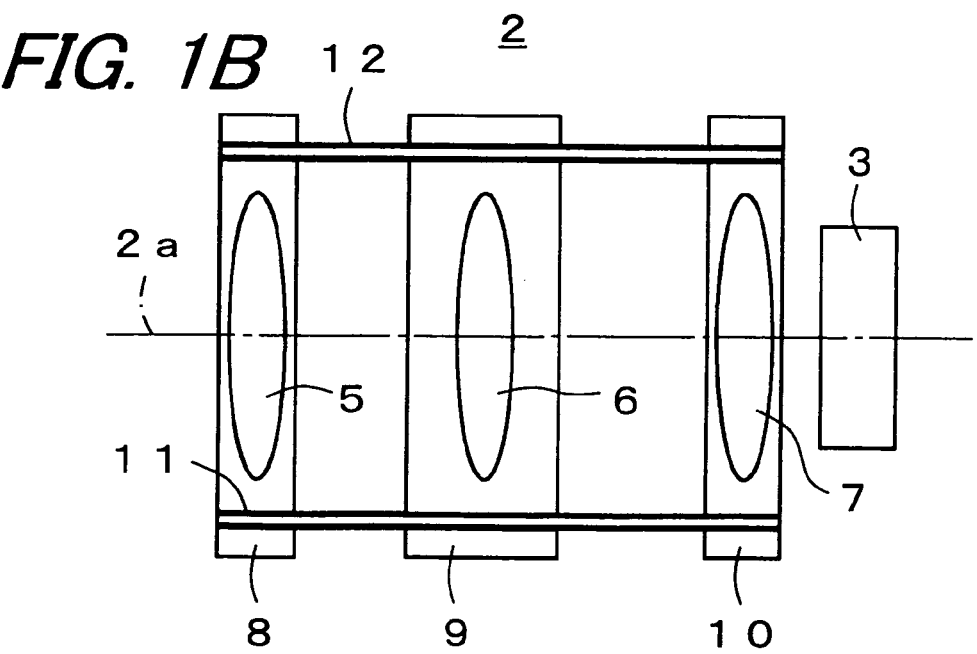

Hereinafter, preferred embodiments of the invention will be described on the basis of FIGS. 1A and 1B. FIGS. 1A and 1B shows an overall configuration of a camera module 1 according to the invention. FIG. 1A shows a simplified external configuration of the camera module 1, and FIG. 1B shows the schematic sectional structure of an optical system in the camera module 1.

As shown in FIG. 1A, the camera module 1 has therein an optical component module 2 having the optical system shown in FIG. 1B, and an image pickup device 3 that detects the light processed by the optical component module 2. The optical component module 2 has a case 4 shown in FIG. 1A. The case 4 is composed of a single member and has a substantially columnar shape so that an optical axis 2a as the optical component module 2 passes through the image pickup device 3. The case 4 is formed of a flexible material, for example, a resin material having flexible. The optical component module 2 shown in FIG. 1B has a configuration in which a lens group composed of a plurality of lenses 5, 6 and 7 are disposed at a front of the optical axis 2a on the optical axis. In addition, although each of the lenses 5, 6 and 7 is shown as a single lens for the purpose of simplification, each lens may be composed of a plurality of lenses. Among the lenses, the lens 5 disposed in front of the optical axis 2a and the lens 7 disposed in front of the image pickup device 3 are fixed lenses that are held by the case 4. At least one lens 6 is configured to be movable in the direction of the optical axis 2a. As the lens 6 moves in the direction of the optical axis 2a, it is possible to take a configuration in which the relative position of the lenses 5, 6 and 7 is optimized. In a case where the camera module 1 is built in a digital camera or a portable telephone, it is possible to pick up a landscape image or the like under the condition of different focal distances like a wide-range shot and close-up shot by separately using wide-angle photographing and telescoping photographing.

Next, members that constitutes the camera module 1 will be described. The size of the optical component module 2 and the image pickup device 3 of the camera module 1 is restricted depending on the size of an apparatus on which the camera module 1 is to be mounted. Further, an optical system provided in the optical component module 2 with respect to the image pickup device 3 is configured so as to be optimized by optical design.

As the image pickup device 3, a device having light-receiving pixels arranged in a one-dimensional line or a three-dimensional plane, such as a CCD image sensor or a CMOS image sensor is used. As the optical component module 2, not only the image pickup device 3 but also a light-receiving device, such as a photodiode or a photo-transistor, can also be used. Moreover, light can be caused to emit from the lens 5 by reversing the direction of traveling of light on the optical axis 2a by using a light-emitting device, such as a light-emitting diode (LED) or a laser diode.

The lenses 5, 6 and 7 are made of an optical transparent material, such as glass or plastic. The glass lens is processed by, mainly, machining. The plastic lens is processed into a lens by mold forming using molds. Further, the shape of the lenses is optimized according to optical design when an optical system using the plurality of lenses 5, 6 and 7 is designed. Each of the lenses 5, 6 and 7 is formed as a spherical lens or an aspheric lens, is formed with an edge if necessary, and is received in and held by a corresponding lens holder 8, 9 or 10.

In a case where the optical component module 2 is used as an optical system capable of zooming and automatic focusing, the module is configured such that a single or a plurality of lenses 6 to be targeted for the zooming and focusing are mounted on the lens holder 9. Each of the lenses mounted on the lens holder 9 is adjusted in assembling so as to suppress eccentricity, and is fixed to the lens holder 9 with an adhesive or the like.

Further, although the lens holder 9 is driven by a driving mechanism including a stepping motor, a cam, and the like so that the lens holder 9 may be caused to slide along the optical axis 2a of the optical component module 2, illustration of the driving mechanism is omitted. The sliding of the lens holder 9 is guided along shafts (a primary axis shaft 11, and a secondary axis shaft 12). The lens holder 9 is made of a resin material, such as ABS, polycarbonate, or liquid crystal polymer, and is formed by processing, such as mold forming or cutting. As the material to be used at this time, it is desirable to use a material having rigidity so that the shape of the lens holder is not deformed or damaged due to falling impact. The primary axis shaft 11 and the secondary axis shaft 12 are formed of a material, such as iron-based metal including stainless steel or the like, or aluminum-based metal, or a copper-based metal including brass or the like. Also, not only a solid rod-like material but also a hollow tubular material can be used as the material for lens holder.

The above-described optical system is mounted on the case 4 that is formed by carrying out processing, such as mold forming or cutting, on a resin material, such as ABS, polycarbonate, or liquid crystal polymer, thereby constituting the optical component module 2. The camera module 1 is formed by combination of such an optical component module 2 and the image pickup device 3.

Figure 2A:
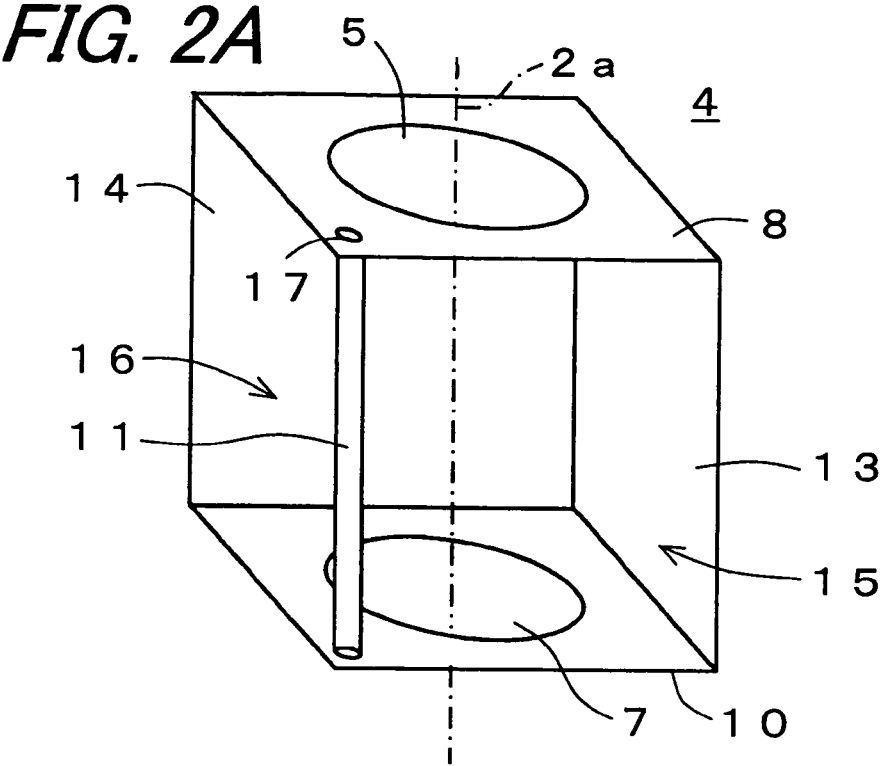
FIGS. 2A and 2B are schematic perspective views showing the structure of a case of FIGS. 1A and 1B while they are compared with each other depending on the existence and nonexistence of a shaft.
Figure 2B:
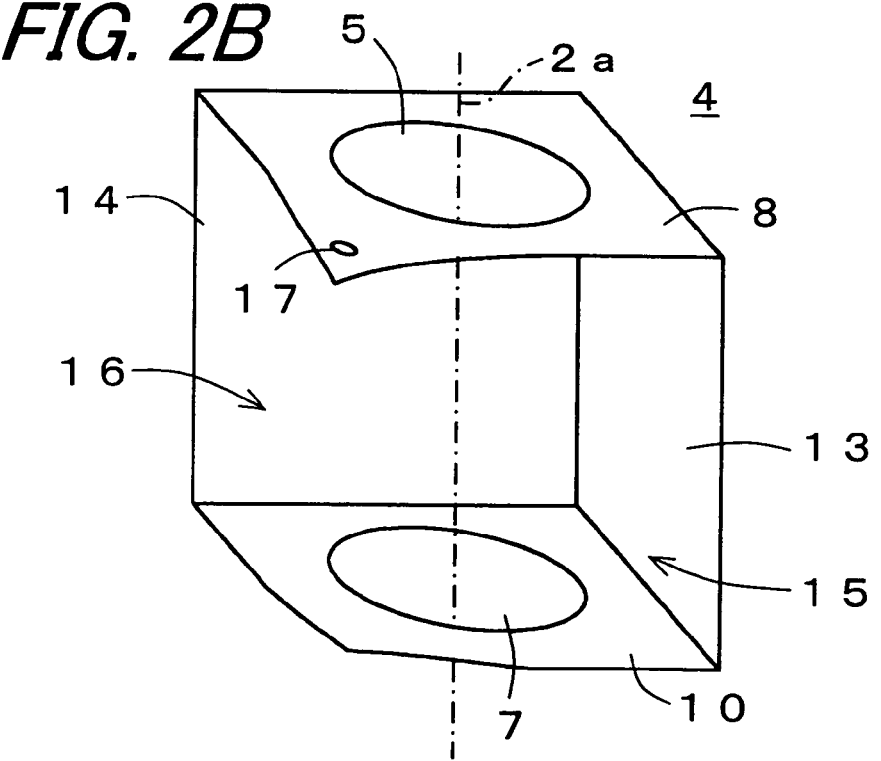

FIGS. 2A and 2B shows the structure of the case 4 shown in FIG. 1A. FIG. 2A shows the structure of the case 4 provided with only one primary axis shaft 11, and FIG. 2B shows the structure of the case 4 provided with no shaft. The case 4 is formed into a columnar structure that extends substantially in the direction of the optical axis 2a, and has a configuration in which end faces thereof perpendicular to the optical axis 2a are used as the lens holders 8 and 10 that fix the non-driven lenses 5 and 7 of the optical system.

Further, the case 4 more specifically has a quadrangular columnar shape, and has a configuration in which, except for two adjacent side surfaces 13 and 14 of four side surfaces parallel to the optical axis 2a, the other side surfaces are provided with openings 15 and 16, respectively. In addition, the openings 15 and 16 may not be the whole side surfaces but portions of the side surfaces. With miniaturization and functional enhancement of the camera module 1, when an optical system is assembled into the case 4 having an opening only in one side surface thereof, problems occurs in that the left and right side surfaces of the opening causes interference with the optical system and consequently assembling adjustment is difficult, and handling of optical components is difficult. However, if the case has a structure without the opening and the two side surfaces adjacent thereto, it is possible to obtain the space for adjusting assembling of the optical system, and it is possible to form the optical system of the high-precision camera module 1. In addition, although the configuration in which two side surfaces are removed is described herein, three adjacent side surfaces are removed to form openings, respectively.

In order to process such a case 4, a method including the molding or cutting as mentioned earlier can be exemplified. In particular, in a case where the case 4 is formed by molding, it is general that molds are disposed such that they can be separated in a plane orthogonal to the optical axis 2a, both molds are then put together, a cavity within the molds is then filled with a resin material, and thereafter the molds are separated to remove the molded material. In the case where the case 4 is formed using such a method, as shown in FIG. 2B, a partial region of the case 4 having no surface parallel to the optical axis 2a, such as the lens holders 8 and 10 may be deformed anyway. In a case where such deformation occurs, if the lenses 5 and 7 are held by the lens holders 8 and 10, respectively, the lenses 5 and 7 are tilted with respect to the optical axis 2a, and consequently the optical performance of the camera module 1 may deteriorate.

For example, the points that become problems in a case in which the lenses 5, 6 and 7 are numbered along the optical axis 2a in this order, and the lens holders 8 and 10 to which a first lens 5 and a third lens 7 are attached, as shown in FIG. 2B, are tilted toward the interior of the case 4 will now be considered. As mentioned earlier, since the first lens 5 and the third lens 7 attached to the lens holders 8 and 10 of the case 4 are tilted with respect to the optical axis 2a, the optical performance of the optical system will deteriorate. Further, since the relative positional relationship between the first lens 5 and the third lens 7 will change in the direction of the optical axis 2a, in order to obtain an optimal relationship to the image pickup device 3, it is necessary to newly perform optimization by movement of the lens holder 9. Even if the lens holder is moved, there is also a fear that an optimal positional relationship cannot be obtained.

For example, assuming that the size of the case 4 of the optical component module 2 is set to 30 mm square, and the tilting angle of the lens holder 8 at one end of the case 4 is about 5 arcminutes, a positional deviation of about 20 μm in the direction of the optical axis 2a will occur in the first lens 5. Further, a light beam entering the center of the lens travels on the optical axis of the tilted first lens 5, and passes through a position deviated by 40 μm from the optical axis 2a in the position of the lens holder 10 at the other end of the case 4. Such a change of several tens of micrometers will have a great effect on the optical performance in addition to manufacturing errors and errors in assembling adjustment along with the miniaturization of the camera module 1.

Moreover, since the tilting of the lens holder 8 at one end of the case 4 also causes a shaft hole 17 for allowing the shaft 11 to pass therethrough to be tilted similarly, a possibility that the shaft 11 is tilted with respect to the optical axis 2a and fixed is considered. As a result, since the second holder 6 that is held by the lens holder 9 that moves using the shaft 11 as a guide shaft also moves while being tilted with respect to the optical axis 2a, this will cause deterioration of the optical performance.

As a method of suppressing the deterioration of the optical performance, it is desirable to takes measures, including determining the shape of the case 4, such as the lens holder 8 at one end of the case and the lens holder 10 at the other end of the case, in consideration of deformation of the case 4 caused by processing, and shaping the shaft hole 17 so as to be parallel to the optical axis 2a after deformation of the case 4. Since such measures are rules of thumb obtained by several trial manufactures, and they are greatly influenced even by processing conditions, there is a problem in that manufacturing variation will increase.

Further, as well as the above problem about the deterioration of the optical performance, if the case has a configuration in which an opening is formed in the side surface as such, the rigidity of the case 4 becomes weak. As a result, even in a case where the case is used for the camera module 1, a problem occurs in that an electronic apparatus is apt to be damaged due to falling thereof.

Therefore, as shown in FIG. 2A, the case is configured such that the shaft 11 is provided in a region without the side surfaces 13 and 14, that is, in a boundary region (corner) where the side surfaces overlap each other exactly. As the method of fixing the shaft 11, there is a method in which the shaft hole 17 is provided, the shaft 11 is then press-fitted through the shaft hole 17 by a required length, and thereafter the shaft is fixed with heat caulking, or the like. Further, there is also a method of inserting the shaft 11 through an opened side surface using deformation of the case 4 because the case 4 is formed of a resin material having flexibility. According to the configuration in which the shaft 11 is provided as such, the length of the shaft 11 is made equal to that of the side surface of the case 4, so that deformation of the structure of the lens holders 8 and 10 at both ends in the direction of the optical axis 2a of the case 4 can be suppressed, and the lens holder 5 and the lens holder 7 and the optical axis 2a can be made perpendicular to each other. Therefore, deterioration of the performance of the optical system can be prevented. Here, as the shaft 11, although the primary axis shaft 11 that becomes a reference shaft that guides the moving lens holder 9 is used, the shaft 12 that becomes a secondary axis shaft as shown in FIG. 1B may be used.

Figure 3A:
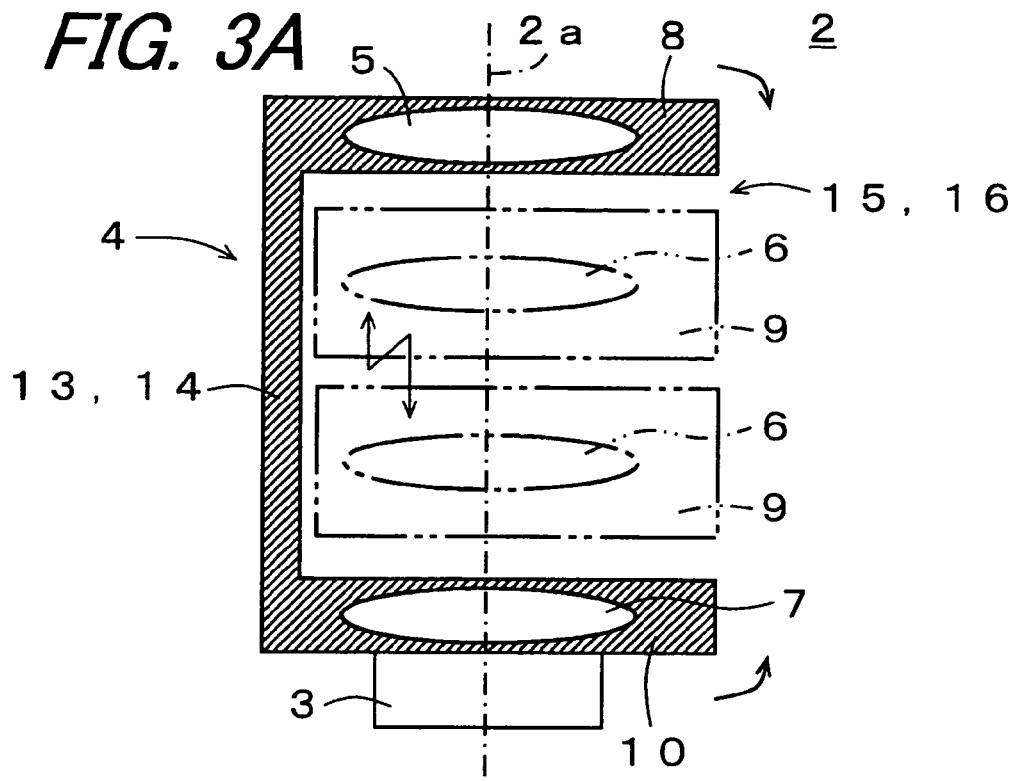
FIGS. 3A and 3B are schematic sectional views showing the structure of a case of FIGS. 1A and 1B compared with depending on the existence and nonexistence of a shaft.
Figure 3B:
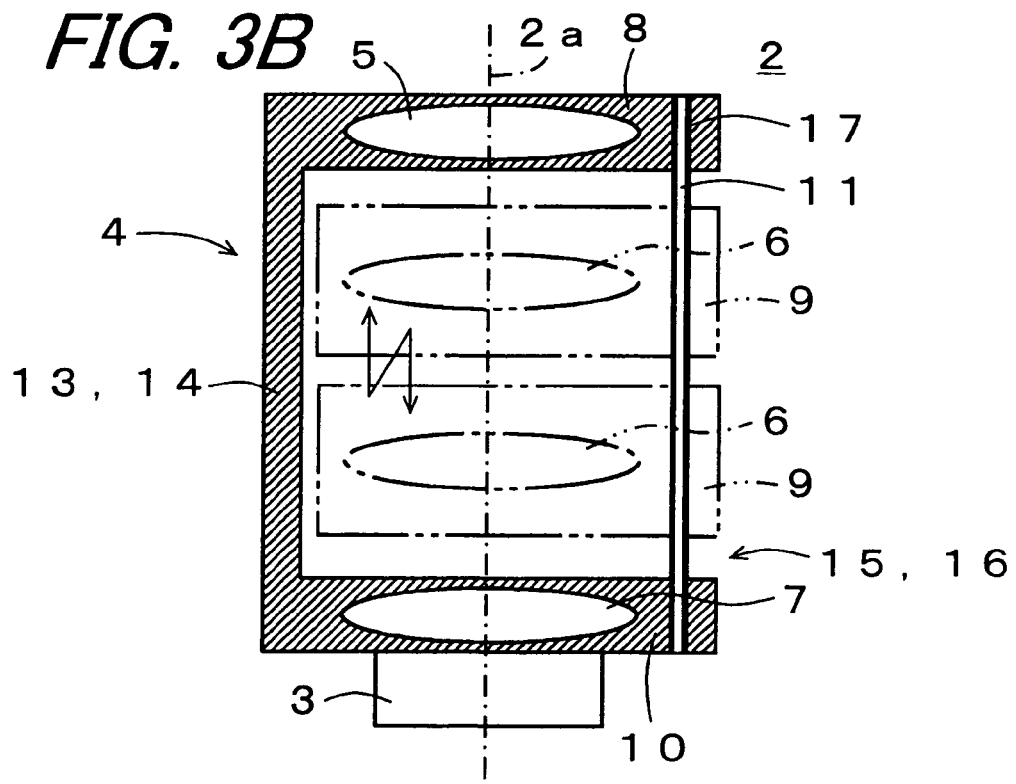

FIGS. 3A and 3B show the effect that the rigidity of a region with no case 4 can be increased by the shaft 11. FIG. 3A shows a configuration in which the shaft 11 is not provided, and the FIG. 3B shows a configuration in which the shaft 11 is provided. If the shaft 11 is not provided as shown in FIG. 3A even if the rigidity of the lens holders 8 and 10, or the like at both ends thereof in the direction of the optical axis 2a of the case 4 is sufficient, portions of the side surfaces 13 and 14 of the case 4 that connect the lens holders 8 and 10 with each other are deformed, which may cause deterioration of the optical performance similar to the deformation of the lens holders 8 and 10 as shown in FIG. 2B.

As described above, by reinforcing the optical component module 2 by the shafts 11 and 12, it is possible to obtain a camera module 1 that is not influenced by a falling impact of an electronic apparatus. Moreover, since tilting of an optical system occurs hardly, even in a case where coma aberration and astigmatism are intended to be improved using a combined lens as an optical component, it is possible to prevent the aberration or astigmatism from being increased due to deformation of the case 4. In addition, as the shape of the case 4, as well as the quadrangular columnar shape, any shape provided with an opening can be adopted, even if the number of corners is different or portions of the side surfaces are curved. In this case, the opening can be reinforced by a shaft by applying the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical component module comprising:
   a case that receives at least one optical component that is movable in a direction of an optical axis, and has a plurality of side walls along the optical axis; and
   a shaft guides movement of the optical component in the direction of the optical axis,
   wherein an opening is formed in each of two adjacent side walls, the openings continuing to each other, and
   the shaft is provided in the opening.

2. The optical component module of claim 1, wherein the shaft is provided on or near an imaginary boundary between the two side walls that existed if the openings were not formed.

3. The optical component module of claim 1, wherein a plurality of the shafts are provided.

4. The optical component module of claim 1, wherein the case is composed of a single member.

5. The optical component module of claim 4, wherein the case is made of a flexible material.

6. A camera module comprising:
   the optical component module of claim 1; and
   an image pickup device.

\* \* \* \* \*